United States Patent
Chisholm et al.

(10) Patent No.: US 6,960,361 B2
(45) Date of Patent: Nov. 1, 2005

(54) SPLIT-PAN FOR PANNING APPARATUS (75) Inventors: Keith A. Chisholm, Chattanooga, TN (US); William R. Ricketts, Cleveland, TN (US)

(73) Assignee: Mars Incorporated, McLean, VA (US)

(*) Notice: Subject to any disclaimer, the term of this patent is extended or adjusted under 35 U.S.C. 154(b) by 0 days.

(21) Appl. No.: 10/308,609

(22) Filed: Dec. 2, 2002

(65) Prior Publication Data

US 2004/0103842 A1 Jun. 3, 2004

(51) Int. Cl.[7] .................................................. A23G 1/04
(52) U.S. Cl. ..................... 426/289; 427/2.14; 427/242; 118/19; 118/303; 118/418; 366/235
(58) Field of Search ..................... 366/130, 235, 366/220; 118/17, 303, 418; 427/2.14, 242; 426/289

(56) References Cited

U.S. PATENT DOCUMENTS

| | | | | |
|---|---|---|---|---|
| 913,399 A | * | 2/1909 | Kilpatrick | 366/175.3 |
| 1,655,144 A | * | 1/1928 | Hallgarth et al. | 366/188 |
| 2,652,805 A | * | 9/1953 | D'Angelo | 118/19 |
| 3,357,398 A | * | 12/1967 | Gross | 118/418 |
| 3,936,534 A | * | 2/1976 | Schallis | 427/215 |
| 4,245,580 A | * | 1/1981 | Okawara | 118/19 |
| 4,676,187 A | * | 6/1987 | Grabowski | 118/19 |
| 5,395,449 A | * | 3/1995 | Quadir et al. | 118/303 |
| 5,495,418 A | * | 2/1996 | Latini et al. | 700/123 |
| 5,845,992 A | * | 12/1998 | MacKelvie | 366/226 |
| 6,142,095 A | * | 11/2000 | Long | 118/13 |

* cited by examiner

*Primary Examiner*—Laura Edwards
(74) *Attorney, Agent, or Firm*—Fitzpatrick, Cella, Harper & Scinto (57) ABSTRACT

A split-pan for a panning apparatus, a panning apparatus incorporating a split-pan, and a method of coating two distinct masses of centers simultaneously with the split-pan are described. The split-pan is formed as a hollow drum, having first and second ends, an interior volume, and at least one partition, positioned between the first and second ends. The partition divides the interior volume into a plurality of coating vessels that allow the simultaneous coating of a plurality of masses of centers in the respective coating vessels.

12 Claims, 6 Drawing Sheets

SPLIT-PAN FOR PANNING APPARATUS

BACKGROUND OF THE INVENTION

1. Field of the Invention

The present invention generally relates to coating pans and to panning apparatus used to produce coatings or shells on a mass of centers. In particular, the present invention relates to a split-pan for a panning apparatus and to a panning apparatus incorporating a split-pan that provide for the simultaneous coating of different masses of centers with different coatings in a single apparatus, such that the different center/coating combinations are not intermingled or mixed.

2. Related Background Art

Panning and film coating are related industrial processes for preparing coated centers. Typically, the term "panning" is used with regard to the application of sugar-based coatings, such as, e.g., sucrose and dextrose to masses of centers. The term "film coating" is used with regard to application coatings that are not based on sugar to masses of centers. However, the basic processes used in panning and film coating are substantially the same. Each process comprises the repetitive application of thin layers of a coating solution or composition onto an intermixed mass of centers, while mixing the mass of centers, and the drying of each layer of coating solution or composition. Each process is performed in a rotating drum or "pan". Panning often comprises three distinct repeating steps; namely, application of the coating solution, distribution of the coating solution on the centers, and drying the coating solution. In contrast, the film coating process often comprises the simultaneous application, distribution, and drying of the coating solution. However, in each process, thin layers of coating material are built up on the center with each application to form the desired shell or coating. The application, distribution, and drying steps may be performed simultaneously or sequentially.

Panning and film coating are used to apply coatings to a variety of different types of centers, including, but not limited to, pellets, tablets, pills and molded or granulated products. Examples of coated centers include pharmaceuticals in the form of pills, tablets, and the contents of time-release capsules; chemical products, such as detergents; and foodstuffs, such as candy. Coatings are typically used to prevent degradation and decomposition of the centers from exposure to air and humidity, to give the coated object a decorative appearance, and have been known to prevent the melting of certain chocolate candies in consumer hands.

Panning and film coating apparatus and processes performed by them for coating centers are well known in the art. A typical panning or film coating apparatus comprises a coating pan and mechanisms for introducing a coating solution and a drying gas into the pan. A mass of centers is introduced into the coating vessel. The mass of centers is then intermixed, a layer of the coating solution is applied to the centers, and the coating layer is dried with the drying gas. The coating may be dispersed by spraying or pouring the coating solution onto the mass of centers. Applying the coating solution while intermixing the mass of centers prevents the coated centers from adhering to each other, and helps insure uniformity. The drying gas, which is often dry air, may be introduced simultaneously with or subsequent to the application of the coating solution.

For example, U.S. Pat. No. 2,652,805 to D'Angelo discloses an apparatus for coating tablets, pills, and other small objects. The disclosed coating apparatus comprises a rotating drum, a drive motor, and optionally, one or more blowers. Pills or tablets placed in the drum are tumbled or intermixed by the rotation of the drum. A coating material, added to the drum, is distributed onto the surface of the pills or tablets. Multiple coats of one or more coating materials may be applied with the apparatus.

U.S. Pat. No. 3,357,398 to Gross discloses a method and apparatus for coating tablets. The apparatus comprises a tiltable perforated drum or pan mounted on a shaft within a housing, a drive motor, and a mechanism for forcing a drying medium, i.e., air, through an inlet in the housing, through the perforated pan, and out an outlet. Tablets are loaded in the perforated drum, which is then rotated to mix them. An atomized coating material is sprayed onto the tablets and the drying medium is passed through the inlet and the perforated drum, as the tablets are mixed.

U.S. Pat. No. 4,245,580 to Okawara discloses a device for coating granular solids. The apparatus comprises a double-cone rotary drum, which is perforated to permit the flow of gas through the drum, a drying gas supply, a drying gas exhaust, annular insulating covers for the drum, and mechanisms for tilting and changing the height of the drum to facilitate loading and unloading. Coating material is sprayed on granular material in the drum, and the drying gas is passed through the drum, as the drum rotates.

U.S. Pat. No. 5,495,418 to Latini et al. discloses an automatic panning system that comprises a rotatable drum in which a mass of centers is tumbled and coated with a solution to form a shell, a spray arm for applying a coating solution, an air flow system to provide a drying air flow, and control means. The coating process consists of the repetition of separate spraying, distribution, and drying cycles in which the condition of the air, the drum speed, and the cycle timer are monitored and controlled by the control means.

However, every known prior art film coating and panning apparatus, such as those described briefly above, allows coatings to be applied to just one mass of centers at a time. Because of the nature of such apparatus, and the process that they perform, a coating material introduced into the coating pan or drum is applied to substantially all of the centers in the mass. Therefore, during production, a different panning apparatus is required for each combination of coating and center that is prepared at any given time. To increase the number of center/coating combinations that can be simultaneously processed using prior art pans requires additional panning apparatus, which, in turn, requires additional capital costs and space. Therefore, a need exists for a panning apparatus that can process two or more center/coating combinations simultaneously. The present invention provides such an apparatus.

SUMMARY OF THE INVENTION

The present invention overcomes the deficiencies of the prior art, discussed above, and provides a novel apparatus and method for coating two or more masses of centers simultaneously. The present invention is directed to a split-pan for a panning apparatus, to a panning apparatus comprising the split-pan of the invention, and to a method of simultaneously coating two or more separate masses of centers in a single panning apparatus. The split-pan of the invention comprises a hollow drum, having first and second ends, the drum defining an interior volume; and at least one partition positioned between the first and second ends. The partition divides the interior volume of the split-pan into a plurality of coating vessels. In a preferred embodiment, the split-pan comprises a single partition positioned between the first end and the second end, such that the partition divides the interior volume into a first coating vessel between the first end and the partition and a second coating vessel between the partition and the second end. Preferably, the first end of the drum defines a first end aperture, and the second end of the drum defines a second end aperture, where each of the first and second end apertures are of a size sufficient to permit introduction of masses of centers into the plurality of coating vessels. However, any means known in the art for introducing masses of centers into the coating vessels may be used. In addition, the partition preferably defines an aperture, configured to allow passage of a drying gas, and sized generally to prevent cross-over and intermixing of centers between coating vessels.

A panning apparatus comprising the split-pan of the invention preferably further comprises a plurality of chutes configured to introduce centers into the coating vessels. At least one coating application mechanism is preferably also provided to apply a coating solution, composition, or mixture to centers in at least one of the coating vessels. Each coating application mechanism is preferably a spray manifold, which may have separate feed lines and nozzles for each coating vessel. Alternatively, a plurality of spray manifolds may be utilized, where each spray manifold is individually configured to spray coating solution or composition on centers in a single coating vessel in the split-pan.

The method of the invention for simultaneously coating two separate masses of centers comprises providing a coating apparatus, comprising the split-pan coating pan of the invention, introducing a mass of centers to be coated into each of the coating vessels in the split-pan, rotating the coating pan, introducing a coating solution or composition into each of the coating vessels, intermixing the mass of centers in each coating vessel to form a coating layer on each of the centers, and drying the coating layers. At least one coating solution or composition introduced into one coating vessel may be different from another coating solution or composition introduced into another coating vessel in the coating pan. Similarly, at least one mass of centers introduced into one coating vessel may be different from at least one other mass of centers introduced into at least one other coating vessel in the coating pan. In addition, at least one coating solution or composition introduced into one coating vessel may be different from at least one other coating solution or composition introduced into another coating vessel in the coating pan, and at least one mass of centers may be different from at least one other mass of centers introduced into another coating vessel in the coating pan.

The method of the invention may further comprise introducing the masses of centers into the coating vessels through apertures defined by the first and second ends of the coating pan, drying the coating layer with a drying gas, where the drying gas may be, for example, dry air, and/or measuring each mass of centers to provide masses of centers that vary in weight, one from the other, by no more than about 2 percent. In a preferred embodiment, the masses of centers are chocolate, and the coating solution is a sugar solution, such as a colored sugar solution.

The apparatus and method of the invention also improve the homogeneity of mixing in a coating pan in a coating apparatus by improving axial mixing in the coating pan. Axial mixing occurs near the side walls that are formed by the ends of a coating pan. By positioning at least one partition within a coating pan, the split pan of the invention introduces two additional walls into the pan for each partition. Therefore, when the pan is rotated, the partition improves the axial mixing of a mass of centers and coating composition in the coating pan, and improves the homogeneity of the coating on the centers.

DETAILED DESCRIPTION OF THE INVENTION

As used herein, the term "pan" refers to a coating vessel, drum, or pan for use in a film coating or panning process. The term "panning" refers to a coating or panning process. The term "panning apparatus" refers to an apparatus for panning or film coating incorporating a pan. Thus, for purposes of describing the present invention, no distinction is made between such apparatus and processes used to apply sugar-based and non-sugar based-coatings.

The present invention is directed to a split-pan for use in a panning apparatus, a coating or panning apparatus comprising the split-pan in accordance with the invention, and to a method of simultaneously coating at least two separate masses of centers. The split-pan of the invention may be used to coat pellets, tablets, pills and molded or granulated products, such as, for example, pharmaceuticals in the form of pills, tablets, and the contents of time-release capsules; chemical products, such as detergents; and foodstuffs, such as candy, including chocolate, and confectionaries. Coatings that may be applied include those that prevent degradation and decomposition of the centers from exposure to air and humidity and/or provide a decorative appearance to the coated object, such as, for example, by providing a decorative or appealing color. The coatings may be any appropriate inorganic or organic coating material. Preferably for candy such as chocolate, and other confectionaries, the coating is formed from a sugar, such as, for example, sucrose, fructose, or dextrose.

A typical prior art panning apparatus comprises a rotating pan, a hopper for storing and/or measuring a mass of centers prior to their introduction into the pan, a chute for introducing the mass of centers into the pan, a spray arm or other device for introducing a coating solution or composition into the pan, and other ancillary equipment, such as, for example, one or more drive motors for the pan, a drive mechanism that can include gears and/or pulleys and belts or the like, and electronic controls.

The split-pan of the invention differs from prior art coating pans in that the split-pan provides at least two coating vessels in a single pan structure. This construction provides for the simultaneous application of one or more coatings to two or more separate masses of centers, where, preferably, one of the masses of centers and/or one of the coatings are different from the other centers and/or coatings. However, as will be understood by those skilled in the art, with the split-pan of the present invention, it is possible to coat a single type of center with a single type of coating by placing the same type of center in each vessel of the split-pan, and applying a single coating to all the centers. Therefore, the number of combinations of centers and coatings that can be processed simultaneously ranges from one up to the total number of coating vessels in the split-pan.

Figure 1:
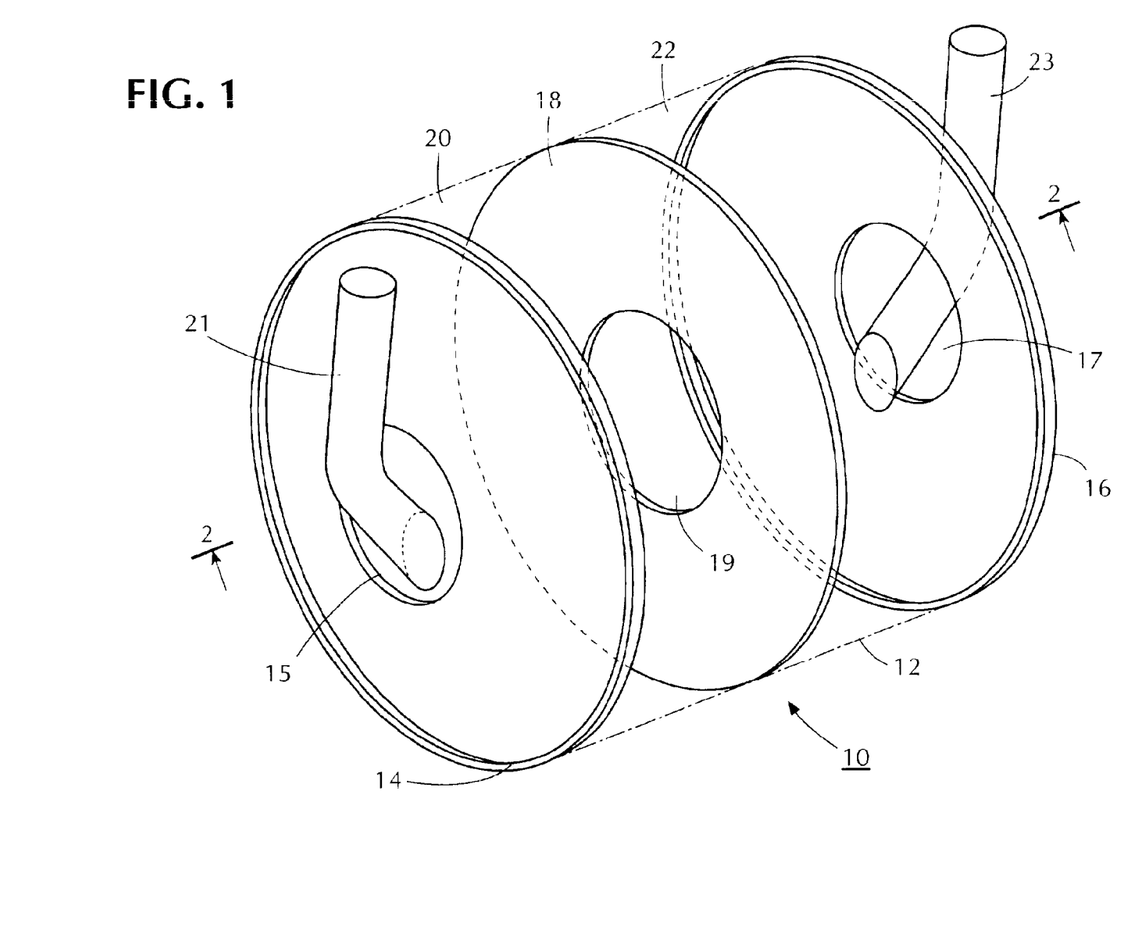
FIG. 1 is a perspective illustration of a split-pan in accordance with a preferred embodiment as shown in present invention.
Figure 2:
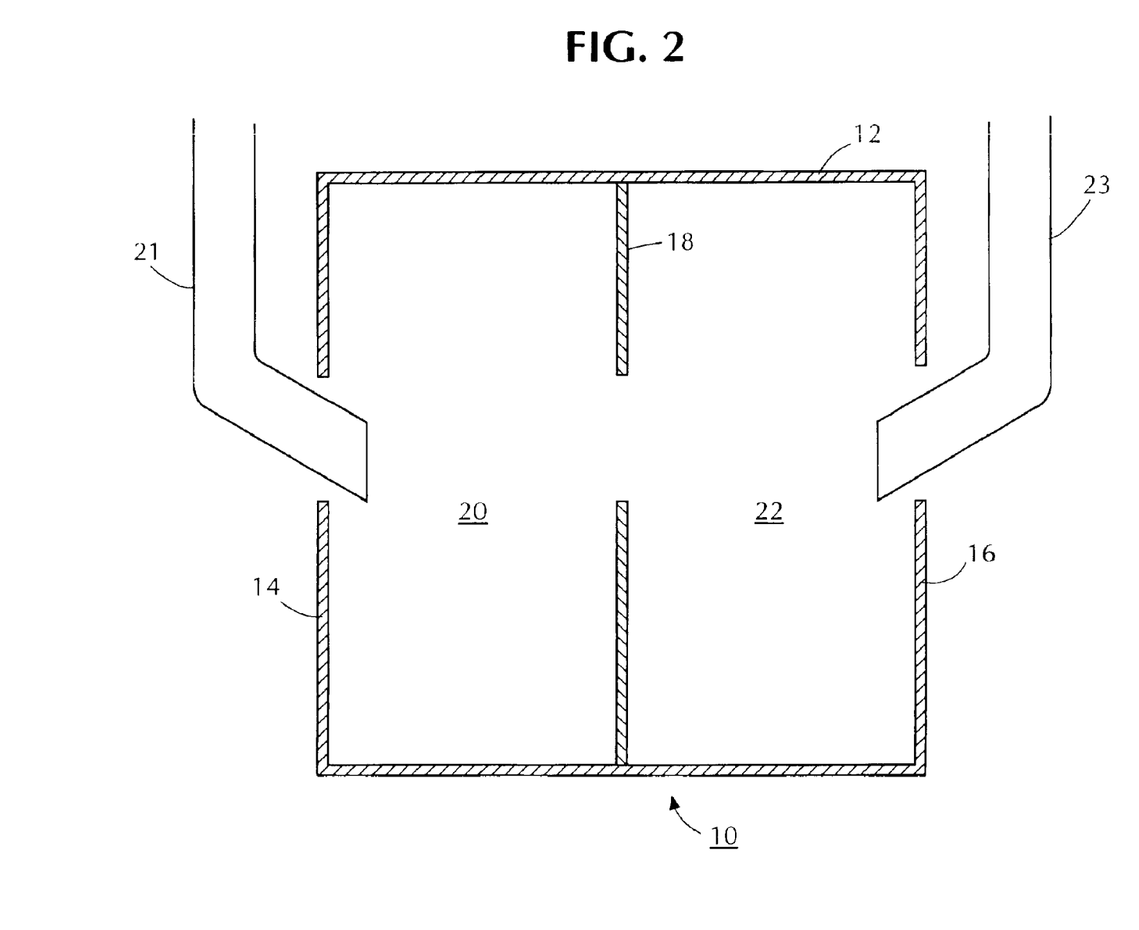
FIG. 2 is a cross-sectional view of the split-pan taken on plane 2—2 in FIG. 1.

A split-pan 10 in accordance with the invention is illustrated in FIGS. 1 and 2, where FIG. 1 is a perspective view, and FIG. 2 is a cross-sectional view taken on plane 2—2 as noted. Split-pan 10 comprises an outer shell or drum 12, having first and second ends 14 and 16, and a partition 18. Centers may be introduced into split-pan 10 by any convenient means known in the art, such as through the discharge gates (not shown) or chutes typically found in the outer shell or drum of prior art pans. Preferably, as illustrated in FIGS. 1 and 2, in the split-pan apparatus of the invention, centers are introduced through chutes 21 and 23. For existing equipment that is modified by the addition of one or more partitions to form a split-pan, it will be necessary to modify the panning apparatus to allow the introduction of multiple masses of centers. This may be accomplished by the addition of one or more additional chutes, and/or the shell or drum 12 may be modified to add one or more additional discharge gates to allow access to coated centers in each section formed within the split-pan by the partitions.

As illustrated in FIGS. 1 and 2, split-pan 10 has a single partition 18, dividing it into first and second coating vessels 20 and 22, where centers are introduced into vessel 20 by chute 21, and into vessel 22 by chute 23. However, as will be understood by those of ordinary skill in the art, more than one partition may be used to further divide split-pan 10 into additional coating vessels. The restraints on the number of partitions and vessels are typically space related. For example, as the number of partitions and vessels increase, additional chutes and/or discharge gates are required to introduce a mass of centers into each of the coating vessels. For a given coating apparatus, the number of gates and/or chutes is limited by the amount of space available in, on, and around the apparatus. Moreover, the mechanism used to supply coating solutions to the centers in the split-pan, such as, for example, a spray manifold, becomes more complex if a different coating solution is to be used with each coating vessel.

Figure 3:
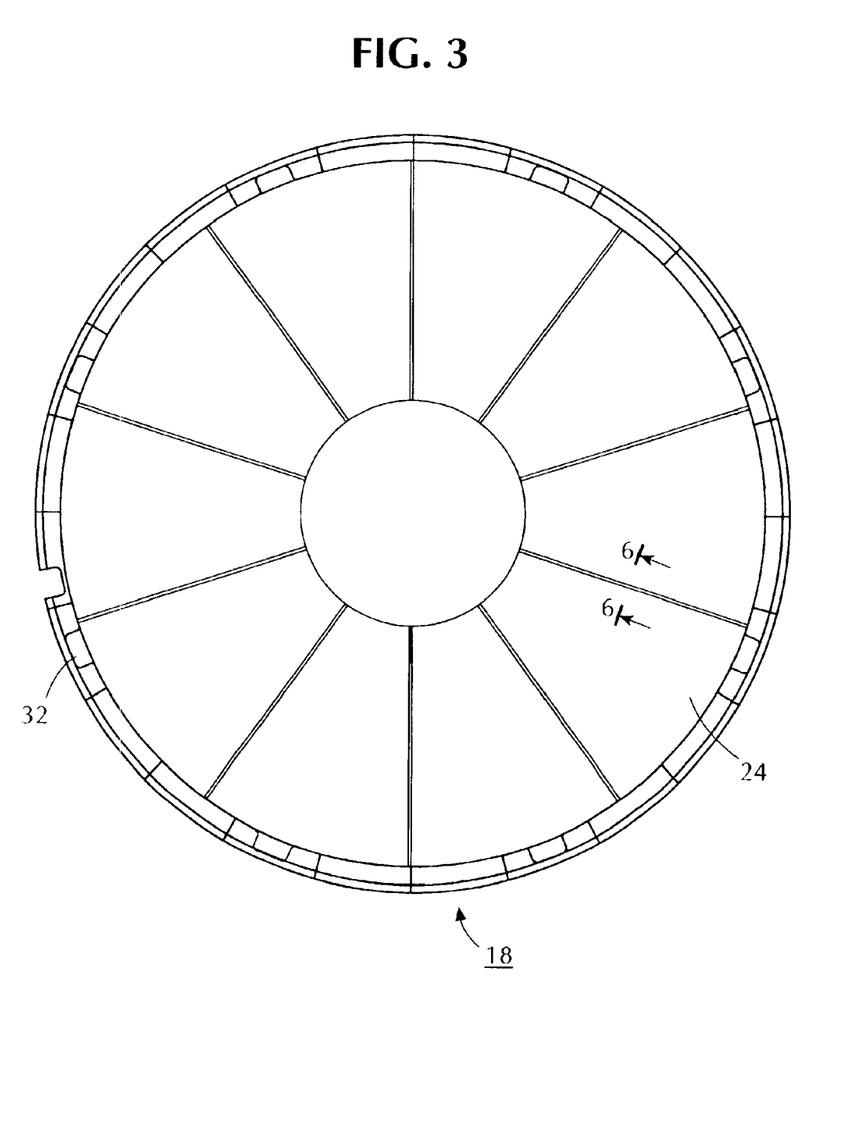
FIG. 3 is a plan view of a segmented partition of a split-pan in accordance with a preferred embodiment of the present invention.

Preferably, first and second ends 14 and 16 of drum 12, respectively, are formed with first end aperture 15 and second end aperture 17, to allow the introduction of centers into coating vessels 20 and 22 by first and second chutes 21 and 23. Also, partition 18 preferably defines aperture 19 to allow a drying gas to pass through split-pan 10. Aperture 19 is preferably sized to generally eliminate cross-over of centers from one coating vessel to the other during a panning process.

Where split-pan 10 is a new construction, partition 18 may be formed of a single piece, as it may be installed during the assembly of the pan. For existing equipment, however, a partition formed from a plurality of pieces may advantageously be provided, as the installation requires passing the partition pieces through at least one of apertures 15 or 17, unless one of ends 14 and 16 is removable. If the partition is assembled from arc segments, as described below, the minimum number of such segments that is required is determined by the diameters of split-pan 10 and of end apertures 15 and 17. That is, each arc segment 24 shown in FIG. 3 must have at least one dimension, other than thickness, that is less than the diameter of end apertures 15 and 17. As can be seen in FIG. 3, partition 18 is formed from 10 arc segments 24 in accordance with the preferred embodiment. However, any convenient number may be used within the constraint noted above.

Figure 4:
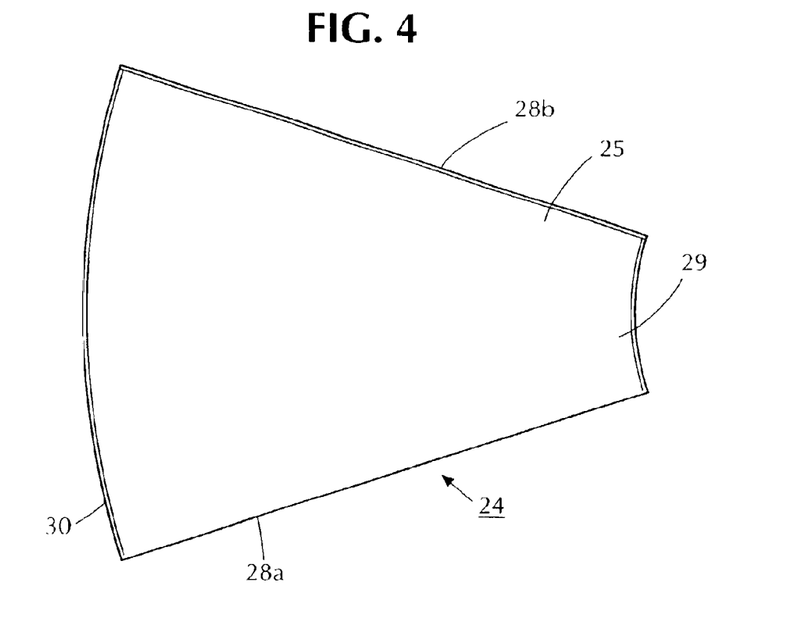
FIG. 4 is a plan view of a segment of the partition shown in FIG. 3.
Figure 5A:
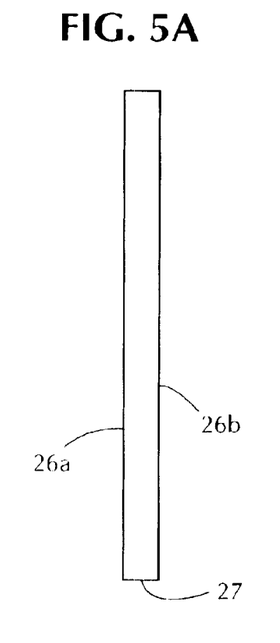
FIGS. 5a and 5b are opposite end views of the partition segment shown in FIG. 4.
Figure 5B:
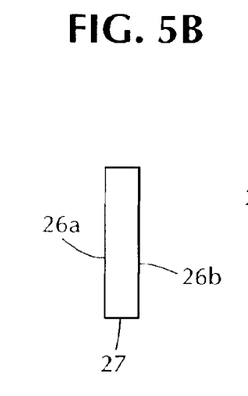
Figure 6:
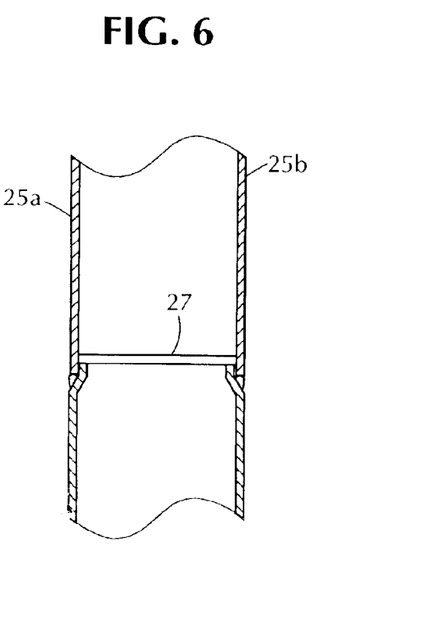
FIG. 6 is a cross-sectional view of the joint between two partition segments taken on plane 6—6 in FIG. 3.

An assembled segmented partition 18, useful in the invention, is illustrated in FIG. 3. As noted, in the preferred embodiment, segmented partition 18 comprises a plurality of interconnected arc segments 24 of the type illustrated in FIG. 4. Each arc segment 24 may be formed from a single sheet of any useful material known in the art, such as metal or composite. Preferably, each arc segment 24 is formed from stainless steel, and, more preferably 12 gauge type 33 stainless steel. Although each arc segment 24 may be formed from a single sheet of material 25, it is preferably formed from a pair of panels 25a and 25b spaced by one or more sections of flat bar, which is preferably of the same material as that used to form panels 25a and 25b. This construction provides strength and durability. Where arc segments 24 are formed from steel, at least one section of flat bar 27 may be welded between panels 25a and 25b along inner circumferential section 29, and at least one section of flat bar 27 may be welded between panels 25a and 25b along outer circumferential section 30 to form each arc segment 24. The required number of segments are then assembled within drum 12, and welded together at joints 31 between adjacent segments, as illustrated in FIG. 6, and bolted or welded into place within split-pan 10 using panel joints 32 shown in FIG. 3.

At least one coating solution application apparatus is required to introduce coating solution into the coating vessels within split-pan 10. A single apparatus that provides a coating solution or mixture to multiple coating vessels may be used, or a separate coating solution application apparatus may be used for each coating vessel or for a group of coating vessels. The apparatus may be of any useful type known in the art. Individual units may be used for each coating vessel, or a single combined unit may be used.

Figure 7:
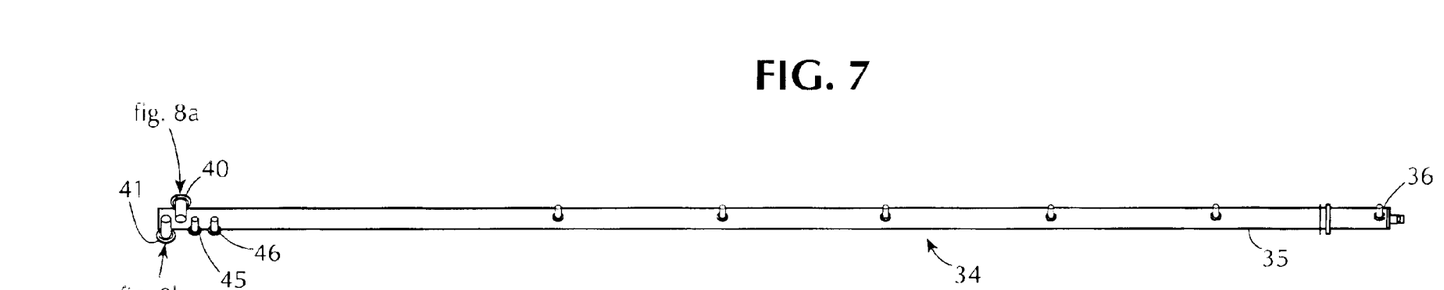
FIG. 7 is an illustration of a spray manifold useful with the split-pan of FIG. 1.
Figure 8A:
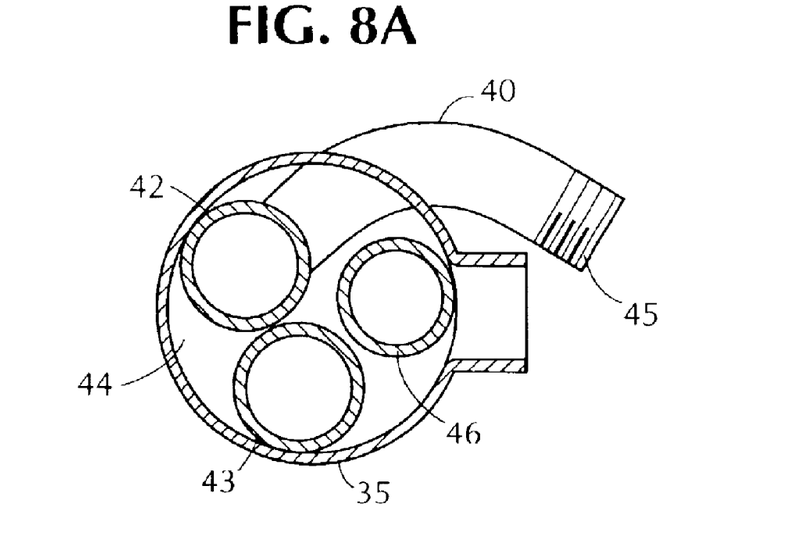
FIGS. 8a and 8b are cross-sectional views of a spray manifold for a split-pan panning apparatus of the invention respectively taken on planes 8a–8a and 8b–8b in FIG. 7.
Figure 8B:
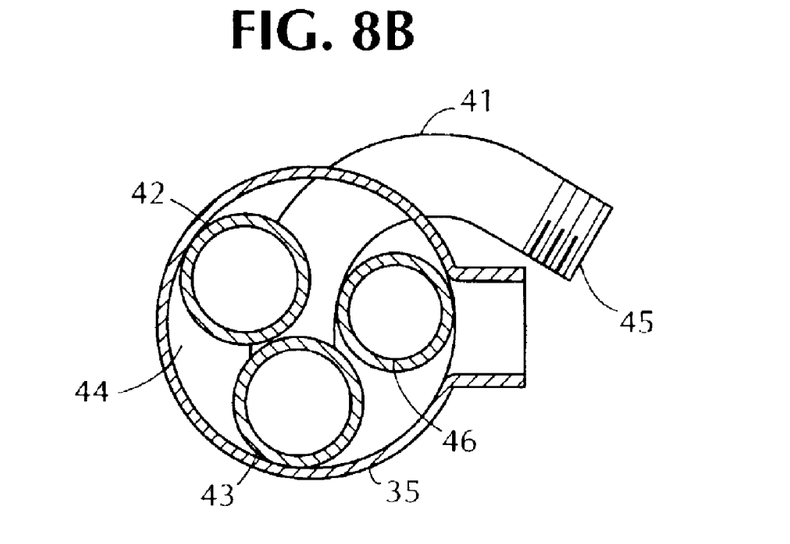
Figure 9:
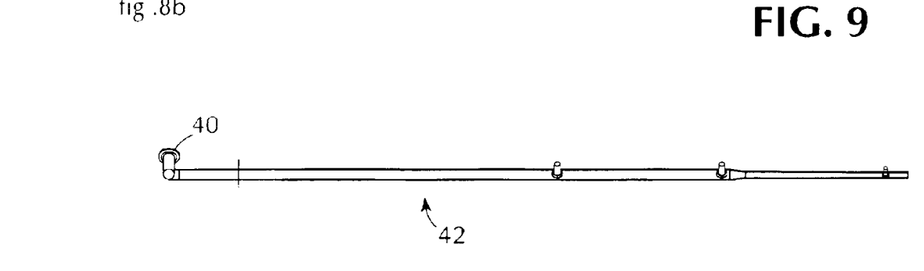
FIG. 9 is an illustration of a syrup supply manifold for one set of nozzles of the spray manifold shown in FIG. 8.
Figure 10:
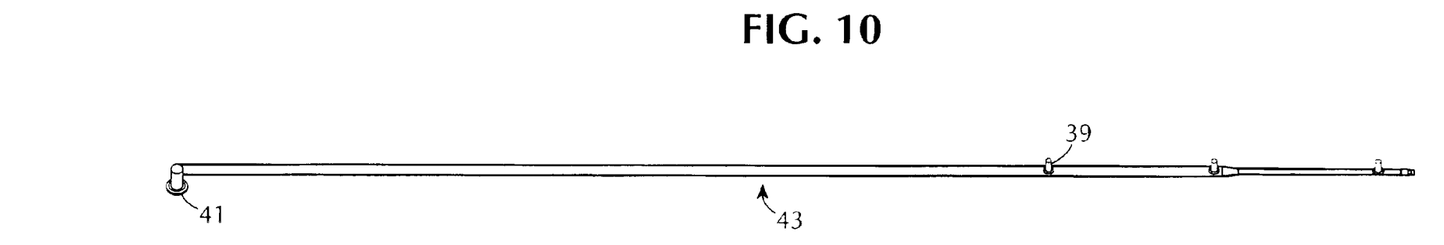
FIG. 10 is an illustration of a syrup supply manifold for a second set of nozzles of the spray manifold shown in FIG. 8.

In one preferred embodiment, the coating solution application apparatus comprises a single spray manifold 34, such as that illustrated in FIG. 7 and in FIGS. 8a and 8b in the form of a single, combined unit. Syrup supply manifolds for each of coating vessels 20 and 22 in split-pan 10 are illustrated in FIGS. 9 and 10 and form a part of the manifold as described below.

Spray manifold 34, as illustrated in FIGS. 7 and 8a and 8b, comprises an outer tube or jacket 35 and a plurality of nozzles 36. Each coating vessel in split-pan 10 is supplied by a separate group of nozzles. As illustrated in FIGS. 7 to 10, first vessel nozzles 38 are supplied with syrup through first vessel feed line or syrup supply 40 for introduction into first coating vessel 20, and second vessel nozzles 39 are supplied with syrup through second vessel feed line or supply 41 for introduction into second coating vessel 22. First vessel nozzles 38 and first vessel syrup supply 40 together form first vessel syrup supply manifold 42, and second vessel nozzles 39 and second vessel syrup supply 41 together form second vessel syrup supply manifold 43. First and second syrup manifolds 42 and 43 are assembled by being inserted into jacket 35, preferably with trace line 44, to form spray manifold 34. Hot water may be introduced through trace supply 45 into trace line 44 to maintain spray manifolds 42 and 43 at a temperature sufficiently high to prevent sugar in the syrup in manifolds 42 and 43 from precipitating or otherwise solidifying or crystallizing, and, thereby, prevent clogging any of nozzles 36 or syrup supplies 40 and 41. Preferably, the temperature of the water should be about 80° C. Trace return 46 is provided to allow the hot water to flow out of trace line 44 and to be reheated.

As will be understood by those skilled in the art, a typical prior art panning apparatus comprises a rotating pan, having an aperture in at least one end, and a chute/hopper combination for introducing a mass of centers into the pan. In the present invention, however, as at least two separate masses of centers must be introduced into split-pan 10. Preferably, this is accomplished using multiple chutes. However, as will be recognized by those skilled in the art, the delivery of each mass of centers to a separate coating vessel may be accomplished with a single movable or variably extendable chute, or by any other means know in the art, including, but not limited to, manually loading a mass of centers into each coating vessel. A single hopper may be used to introduce masses of centers into multiple chutes, or a separate hopper may be used to introduce a mass of centers into each chute. If the split pan apparatus in accordance with the invention is to occupy no more space than a conventional single pan prior art apparatus, then each coating vessel 20 and 22 will be about one-half the size of a single pan prior art vessel. In such a case, each mass of centers introduced into split-pan 10 will likely be no more than half as large as the mass introduced into a prior art single pan, so that, if two hoppers are employed, hopper 48 need be no larger than half the size of a hopper used with a typical single prior art panning apparatus.

A split-pan apparatus of the invention having a single partition and two coating vessels functions as follows. Two charges of centers, which may be the same as or different from each other, are preferably weighed and separately loaded into a pair of hoppers positioned on opposite ends of a coating pan. The centers may be loaded into the hoppers by any means known in the art, such as by using a loss-in-weight feeder. The size of each charge is usually, but not necessarily, substantially the same for each coating vessel in the split-pan. Most preferably, the variation in the masses is no more than about 2 percent. Each hopper communicates with one of the coating vessels through a chute, such that, when a release mechanism on each hopper is operated, the mass of centers in each hopper flows through the corresponding chute and into the corresponding coating vessel of the split-pan. The split-pan is then rotated, and a coating solution or mixture is introduced into each coating vessel, through the spray manifold, where the coating solution introduced into one coating vessel may be the same as or different from that introduced into the other coating vessel. The coating solution or mixture is ordinarily introduced into each coating vessel in an amount sufficient to produce a thin coating on each of the centers in that vessel. A drying gas, such as dry air, is thereafter allowed to flow through the apertures of the split-pan and the partition, drying the coatings on the centers. Once the coatings have dried sufficiently, an additional coating may be applied to the centers in the same fashion as described above, and the process is repeated until a final coating of the desired thickness is obtained. Preferably, at least one coating solution introduced into a first coating is different than the coating solution introduced into a second vessel. More preferably, the coating solutions will differ in color. Also, the centers will preferably be confectionery, e.g., chocolate, peanut, peanut butter, or rice centers.

Where different coating solutions or mixtures are used, the coating solutions or mixtures should be compatible. In particular, the drying rates for the coating solutions or mixtures used in the split-pan should be equivalent, so that the coating on each mass of centers in the pan dries at substantially the same rate. For example, for color coating candy centers, different "Lake" color coatings may be used together because such coatings have similar drying rates. Different dye colors may also be used simultaneously, again, because they have similar drying rates.

The split-pan of the invention also provides improved axial or lateral mixing, which results in more homogeneous mixing of the centers in the pan. Two types of mixing occur within a coating pan. The first is radial mixing in which a mass of centers in the pan is mixed along the radius of the pan, i.e., through the depth of the mass of centers, by the rotation of the pan. However, radial mixing alone is not sufficient to provide a mass of homogeneously coated centers in a coating pan, as an even distribution of coating solution along the axis of the pan is difficult, if not impossible, to obtain for a large mass, i.e., on the order of a ton, of centers. Obtaining a uniform spray distribution will clearly improve the homogeneity of the coated centers, but the uniformity of the spray distribution is difficult to control with a large coating pan. Therefore, to obtain a mass of homogeneously coated centers, axial mixing, in which the centers are mixed along the length or axis of the pan, is also required. To obtain axial mixing, prior art coating pans include internal baffles and tunnels to force centers to move from side-to-side within the pan. However, the use of baffles and tunnels makes cleaning of the interior of the pan significantly more difficult.

It has been found that improved axial mixing occurs near the side walls that are formed by the ends of a coating pan. By positioning at least one partition within a coating pan, the split pan of the invention introduces two additional walls into the pan for each partition, thus, improving axial mixing. Therefore, the split-pan of the invention is useful when a single mass of centers is coated with a single coating solution or composition.

The numbers of revolutions of a coating pan required to obtain a substantially uniformly coated mass of centers is a measure of the amount of axial mixing in the pan. In a typical prior art coating pan, the number of revolutions required to obtain a substantially uniformly coated mass of centers is greater than 500. In contrast, with the split-pan of the invention, the number of revolutions required to obtain a substantially uniformly coated mass of centers is less than 500, and can be significantly less than 100. Preferably, the number of revolutions required to obtain a substantially uniformly coated mass of centers is less than 400, more preferably, less than 300, and, most preferably, less than 200.

Accordingly, it will be appreciated that the present invention has been described with references to particular preferred embodiments that are now contemplated. However, the invention is not limited by the embodiments disclosed herein and it will be appreciated that numerous modifications and other embodiments may be devised by those skilled in the art. Therefore, it is intended that the appended claims cover all such modifications and embodiments that fall within the true spirit and scope of the present invention.

What is claimed is:

1. A method of coating at least two separate masses of centers simultaneously in a single coating apparatus, the method comprising the steps of:

providing the coating apparatus, which comprises a coating pan including an outer shell having first and second ends, with the pan defining an interior volume, and at least one partition within the shell, dividing the interior volume into a plurality of coating vessels and generally preventing the intermixing of the separate masses of centers, wherein each coating vessel has at least one aperture for the introduction of a mass of centers and a coating composition into each coating vessel;

introducing the mass of centers to be coated into each of the coating vessels, wherein the masses of centers in different coating vessels may be the same as or different from each other;

optionally, measuring each mass of centers to provide masses of centers that vary in weight, one from the other, by no more than about 2 percent;

rotating the coating pan;

generally preventing cross-over and intermixing of centers between coating vessels with the partition;

introducing a coating composition into each of the coating vessels, wherein each coating composition introduced into different coating vessels may be the same as or different from one another;

intermixing the mass of centers and coating composition in each coating vessel to form a coating layer on each of the centers; and drying the coating layers.

2. The method of claim 1, wherein at least one coating composition introduced into a coating vessel is different from at least one other coating composition introduced into another coating vessel in the coating pan; or at least one mass of centers introduced into a coating vessel is different from at least one other mass of centers introduced into another coating vessel in the coating pan; or at least one coating composition introduced into a coating vessel is different from at least one other coating composition introduced into another coating vessel in the coating pan, and at least one mass of centers is different from at least one other mass of centers introduced into another coating vessel in the coating pan.

3. The method of claim 1, further comprising the steps of:

providing apertures in each of the first and second ends of the coating pan; and introducing the masses of centers into the coating vessels through the apertures provided in the first and second ends.

4. The method of claim 1, wherein the drying step comprises drying the coating layer with a drying gas.

5. The method of claim 4, wherein the drying gas is dry air.

6. The method of claim 1, wherein the masses of centers are chocolate, and the coating composition is a sugar solution that is optionally a colored sugar solution.

7. A panning apparatus comprising:

a split-pan comprising a hollow drum, having first and second ends, the drum defining an interior volume, and at least one partition, positioned between the first and second ends, thereby dividing the interior volume into a plurality of coating vessels, each coating vessel configured for coating a separate mass of centers, and thereby preventing the general intermixing of the separate masses of centers, wherein each coating vessel has at least one aperture for the introduction of the mass of centers and a coating composition into each coating vessel; and at least one coating application mechanism, configured to apply a coating composition to centers in at least one of the coating vessels, wherein said at least one coating application mechanism is a single spray manifold including separate feed lines and nozzles for each coating vessel or a plurality of spray manifolds, each spray manifold individually configured to spray coating composition on centers in a single coating vessel in the split-pan.

8. The panning apparatus of claim 1, wherein a single partition is positioned between the first end and the second end, such that the partition divides the interior volume into a first coating vessel between the first end and the partition and a second coating vessel between the partition and the second end.

9. The panning apparatus of claim 1 further comprising a plurality of chutes, each configured to introduce a mass of centers into one of the coating vessels.

10. A panning apparatus comprising:

a split-pan comprising a hollow drum, having first and second ends, the drum defining an interior volume, and a partition, mounted in the drum between the first and second ends, thereby dividing the interior volume into a first coating vessel between the first end and the partition and a second coating vessel between the partition and the second end, and thereby preventing the general intermixing of masses of centers in the first and second coating vessels, wherein each coating vessel has at least one aperture for the introduction of a mass of centers and a coating composition into each coating vessel; and at least one coating application mechanism, configured to apply a coating composition to centers in at least one of the coating vessels, wherein said at least one coating application mechanism is a single spray manifold including separate feed lines and nozzles for each coating vessel or both a first spray manifold configured to spray a coating composition on centers in the first coating vessel and a second spray manifold configured to a spray coating composition on centers in the second coating vessel.

11. The panning apparatus of claim 10, further comprising a first chute configured to introduce centers into the first coating vessel, and a second chute configured to introduce centers into the second coating vessel.

12. A method of improving axial mixing of a mass of centers in a coating pan in a coating apparatus, the coating pan comprising an outer shell, having first and second ends, the shell and the ends defining an interior volume, the method comprising:

providing at least one partition within the shell, wherein the partition divides the interior volume into a plurality of coating vessels, each coating vessel configured for coating a separate mass of centers, and wherein the partition generally prevents cross-over and intermixing of centers between coating vessels, and improves axial mixing of the mass of centers in the coating pan when the coating pan is rotated;

wherein each coating vessel has at least one aperture for the introduction of the mass of centers and a coating composition into each coating vessel; and wherein the coating apparatus further comprises at least one coating application mechanism, configured to apply a coating composition to centers in at least one of the coating vessels, said at least one coating application mechanism being a single spray manifold including separate feed lines and nozzles for each coating vessel or a plurality of spray manifolds, each spray manifold individually configured to spray coating composition on centers in a single coating vessel.

* * * * *

UNITED STATES PATENT AND TRADEMARK OFFICE
CERTIFICATE OF CORRECTION

PATENT NO. : 6,960,361 B2 Page 1 of 1
DATED : November 1, 2005
INVENTOR(S) : Keith A. Chisholm

It is certified that error appears in the above-identified patent and that said Letters Patent is hereby corrected as shown below:

<u>Column 8,</u>
Line 1, "drys" should read -- dries --.

<u>Column 10,</u>
Line 3, "claim 1," should read -- claim 7, --; and
Line 9, "claim 1" should read -- claim 7, --.

Signed and Sealed this

Twenty-eighth Day of March, 2006

JON W. DUDAS
*Director of the United States Patent and Trademark Office*